United States Patent [19]
Thomsen

[11] Patent Number: 5,876,238
[45] Date of Patent: Mar. 2, 1999

[54] DEVICE AND METHOD FOR SECURING INTEGRITY OF A BLIND AUTODOCK ELECTRICAL CONNECTION

[75] Inventor: Peter Matthew Thomsen, Austin, Tex.

[73] Assignee: International Business Machines Corporation, Armonk, N.Y.

[21] Appl. No.: 877,486

[22] Filed: Jun. 17, 1997

[51] Int. Cl.[6] .................................................. H01R 3/00
[52] U.S. Cl. ................................... 439/489; 439/374
[58] Field of Search ................................... 439/188, 489, 439/490, 374; 200/51.09, 51.1, 51.11

[56] References Cited

U.S. PATENT DOCUMENTS

| | | |
|---|---|---|
| 3,594,700 | 7/1971 | Nava et al. . |
| 3,901,574 | 8/1975 | Paullus et al. . |
| 3,960,428 | 6/1976 | Naus et al. . |
| 4,090,761 | 5/1978 | Souville et al. . |
| 4,290,662 | 9/1981 | Storcel . |
| 4,373,770 | 2/1983 | Raux et al. . |
| 4,917,525 | 4/1990 | Duncan ................................... 403/27 |
| 5,030,128 | 7/1991 | Herron et al. ........................ 439/372 |
| 5,378,165 | 1/1995 | Comerci et al. ...................... 439/188 |
| 5,381,043 | 1/1995 | Kohiyama et al. ............... 439/188 X |
| 5,404,268 | 4/1995 | O'Connor .............................. 361/683 |
| 5,484,298 | 1/1996 | Flum et al. ........................... 439/188 |
| 5,486,119 | 1/1996 | Nabeshima et al. .................. 439/489 |
| 5,534,787 | 7/1996 | Levy ..................................... 324/761 |
| 5,586,917 | 12/1996 | Yagi et al. ............................ 439/752 |
| 5,700,165 | 12/1997 | Harris et al. ......................... 439/621 |

*Primary Examiner*—Khiem Nguyen
*Attorney, Agent, or Firm*—Joseph A. Sawyer, Jr.; Volel Emile

[57] ABSTRACT

The present invention provides a device and method for securing integrity of a blind autodock electrical connection in a computer system. A method and device according to the present invention for insuring integrity of a blind autodock electrical connection for use with a computer system includes a stationary assembly and a module. The method and device comprises a first electrical connector coupled to the stationary assembly and a second electrical connector coupled to the module. It also includes a connector sensor coupled to the first connector, and a connector sensor receiver coupled to the second connector. The connector sensor is a device including connector sensors which are coupled via a wire. Connection to at least part of the wire is provided via the second connector to create a circuit which includes a status providing device for determining whether the connector sensor and the connector sensor receiver are coupled in a predetermined manner, wherein the circuit provides an indication of the blind autodock electrical connection integrity.

11 Claims, 3 Drawing Sheets

DEVICE AND METHOD FOR SECURING INTEGRITY OF A BLIND AUTODOCK ELECTRICAL CONNECTION

FIELD OF THE INVENTION

The present invention relates generally to electrical connections, particularly, to a device and method for ensuring a proper blind autodock electrical connection in a computer system.

BACKGROUND OF THE INVENTION

A computer system typically includes a stationary assembly and modules which can be docked onto the stationary assembly. The stationary assembly typically includes the computer housing, and connections, while the various modules which can be docked and connected onto the stationary assembly typically include a majority of the computer electronics. While in use, the modules are connected to the stationary assembly. However, for repair and maintenance purposes, a module can be disconnected and separated away from the stationary assembly for ease of access and replacement. The connectors utilized for both the stationary assembly and the modules are typically elongated due to the large number of pins required for appropriate connection between the stationary assembly and the modules. Due to their elongated shape, it can be difficult to fully connect every pin within the connectors. A misclocked connection can result in either an open contact or an intermittent contact. Additionally, the connection can also be dislodged during transport.

Since the module is normally docked within the computer housing, there is typically no visual way of insuring that the connection has properly been made. Since the connection itself is typically a high performance connection, it is a critical connection. If the connection is not fully secure, then system integrity can be lost.

In the conventional computer system, some partial tests can be made to see if the module can be accessed, however, there is no guarantee that the connection is secure. Typically, in the absence of problems, the connection is assumed to be proper. However, a partial connection can produce sporadic results and is more likely to become dislodged.

Due to variations in the manufacturing processes, connections typically need tolerances due to the possibility of slightly mismatched components which may later be used in service. For instance, if an old module is replaced with a new module, the manufacturer of the new module may not have used the exact same components as the manufacturer of the old module. Thus, the conventional connector should have tolerances to allow for such minor differences. These tolerances can increase the chance of a partial connection or a partial engagement of the connectors.

Accordingly, what is needed is a device and method for securing integrity of a blind autodock electrical connection in a computer system. The present invention addresses such a need.

SUMMARY OF THE INVENTION

The present invention provides a device and method for securing integrity of a blind autodock electrical connection in a computer system. A method and device according to the present invention for insuring integrity of a blind autodock electrical connection for use with a computer system includes a stationary assembly and a module. The method and device comprises a first electrical connector coupled to the stationary assembly and a second electrical connector coupled to the module. It also includes a connector sensor coupled to the first connector, and a connector sensor receiver coupled to the second connector. The connector sensor is a device including connector sensors which are coupled via a wire. Connection to at least part of the wire is provided via the second connector to create a circuit which includes a status providing device for determining whether the connector sensor and the connector sensor receiver are coupled in a predetermined manner, wherein the circuit provides an indication of the blind autodock electrical connection integrity.

DESCRIPTION OF THE INVENTION

The present invention relates to a method and device for securing integrity of a blind autodock electrical connection. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
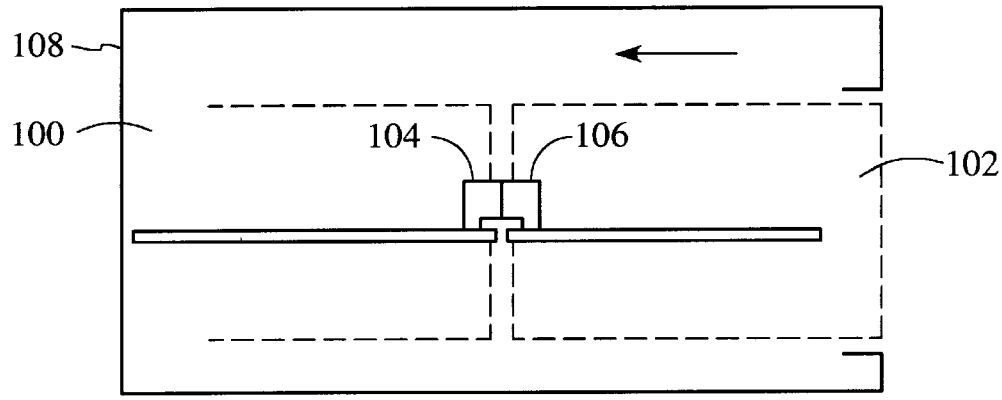
FIGS. 1a–1c show an illustration of the conventional connection typically utilized between the stationary assembly and a module.

FIG. 1a shows a side view of conventional electrical connectors 104 and 106 between a stationary assembly 100 and a module assembly 102 within a computer housing 108. Connector 104 is shown coupled to the stationary assembly 100, while connector 106 is shown coupled to the module assembly 102. This type of connection is typically referred to as a blind autodock electrical connection due to the fact that it is typically located within a housing 108.

Figure 1B:
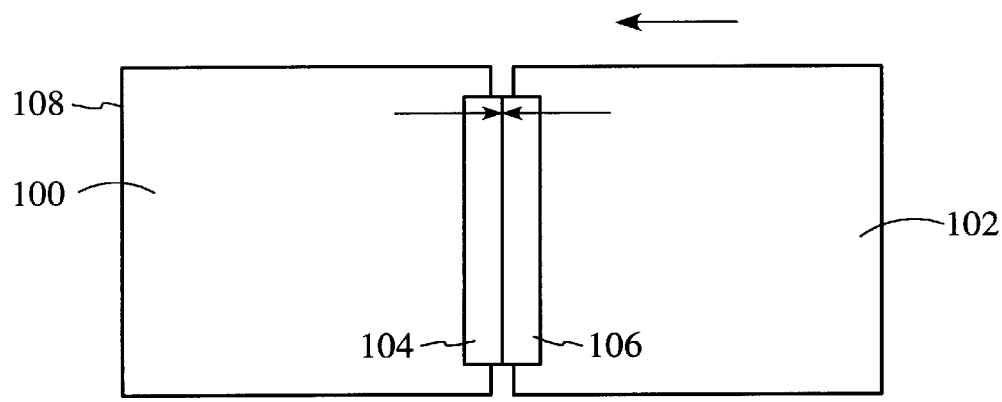

FIG. 1b shows a top view of the conventional connection devices 104 and 106. When the connection is properly made, every portion of the connectors 104 and 106 should be securely connected.

Figure 1C:
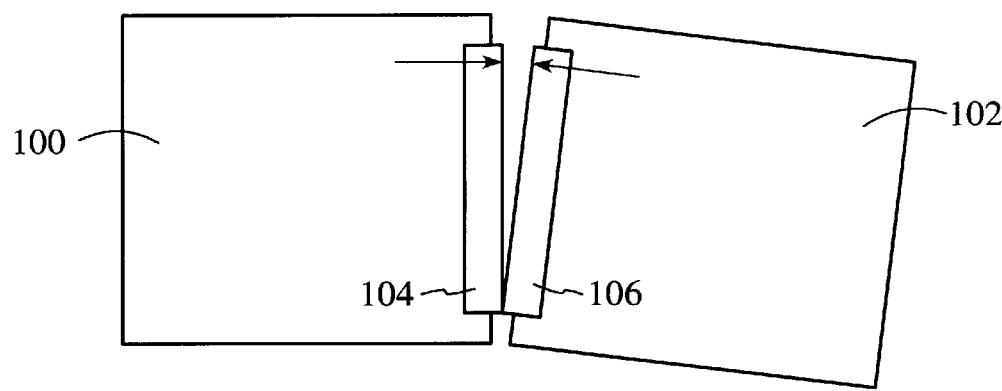

FIG. 1c shows an exaggerated view of a misdocked connection for conventional connector devices 104 and 106. As it is typical to have connectors 104 and 106 elongated to accommodate for the large number of connections required within the connectors 104 and 106, the weight of the module assembly 102 can cause a portion of the connectors 104 and 106 to be misdocked. Alternatively, the weight of the module 102 can cause the connectors 104 and 106 to become dislodged in at least a portion of the length of the connectors 104 and 106.

The method and device of the present invention addresses the above problem by utilizing a docking integrity checking circuit. The method and device of the present invention provides both a mechanical and electrical check with one simple implementation and only requires the use of a status signal.

A status signal is generated and can be monitored by a computer system at the startup time to determine the integrity of the autodock connection. This signal will determine whether the connection is fully engaged, partially engaged, or unengaged completely.

Figure 2:
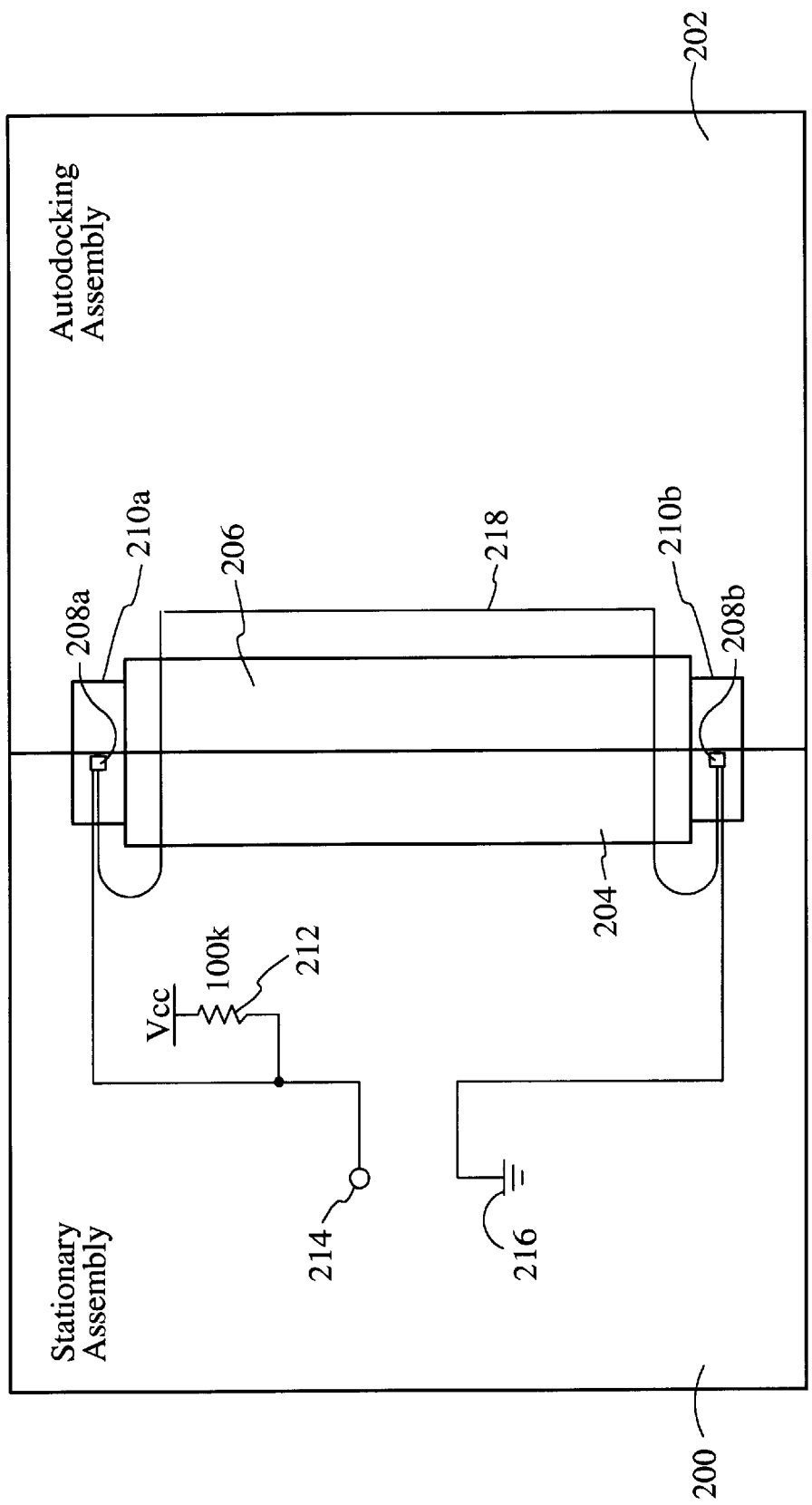
FIG. 2 shows an illustration of a connector assembly according to the present invention.

FIG. 2 shows a top view of the method and device according to the present invention. FIG. 2 includes a stationary assembly 200, and a module assembly 202. The stationary assembly is shown to include a connector 204 while the module assembly 202 includes the connector 206. The connector 204 includes connector sensors 208*a* and 208*b*, while the connector 206 includes connector sensor receivers 210*a* and 210*b*. The connector sensors 208*a* and 208*b* are electrically coupled via an electrical wire 218, creating a circuit. The circuit further includes a pullup resistor 212, a status line 214, and a ground 216.

When the connector sensors 208*a* and 208*b* are coupled with the connector sensor receivers 210*a* and 210*b* in a predetermined manner, then there is an electrical indication that the connectors 204 and 206 are properly docked. The coupling in a predetermined manner depends on the type of connector sensors 208*a* and 208*b* used. One of ordinary skill in the art would be able to determine numerous types of connector sensors and receivers which may be used.

For example, in operation, the pullup resistor 212 creates a value of '1' on the status line 214. If the connectors 204 and 206 are not connected well, then a state of '1' will remain on the status line 214. If, however, the connectors 204 and 206 are connected well, then the ground 216 will dominate and cause a '0' state on the status line 214. One of ordinary skill in the art would understand that there can be variations to the circuit shown in FIG. 2. For example, the pullup resistor 212 may be a pulldown resistor which creates a value of '0' on the status line 214.

Figure 3:
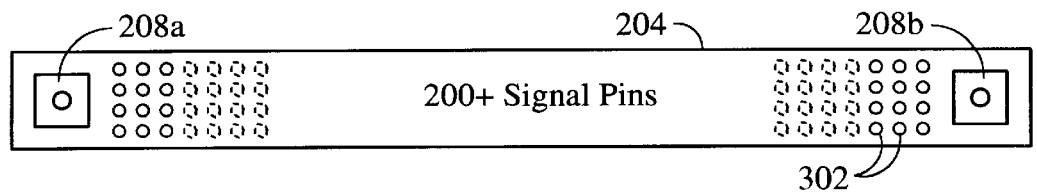
FIG. 3 shows a view into a connector according to the present invention.

FIG. 3 shows a view into a connector 204. The connector 204 includes signal pins 302. A connector 204 can include multiple signal pins, such as 200+signal pins. The connector 204 is also shown to include connector sensors 208*a* and 208*b*.

Figure 4A:
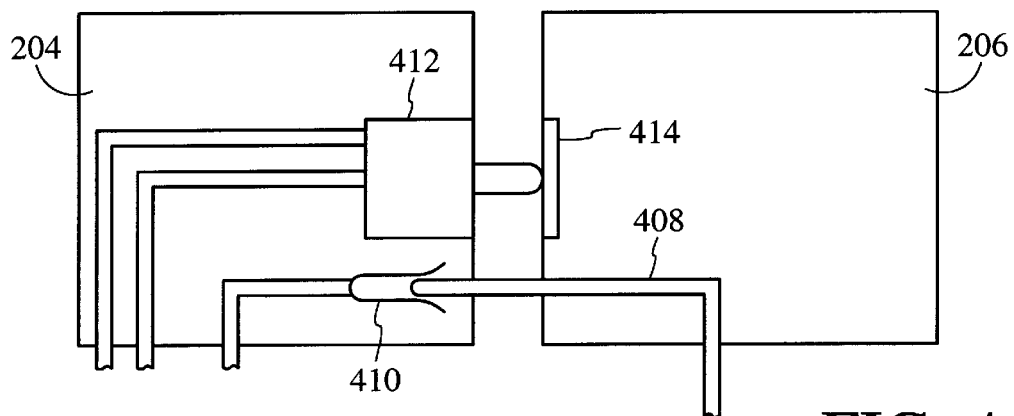
FIGS. 4a–4b respectively show side views of a partially seated device and a fully seated device according to the present invention.

FIG. 4*a* shows a side view of a partially seated connection of connectors 204 and 206. The connector 204 is shown to include a signal receptacle 410 and a connector sensor 412. The connector 206 is shown to include a connector sensor receiver 414 and a signal pin 408. When the connector 206 is not fully connected with the connector 204, then the signal pin 408 is not fully received by the signal receptacle 410, and the connector sensor 412 does not send a signal indicating that a proper connection has been made.

Figure 4B:
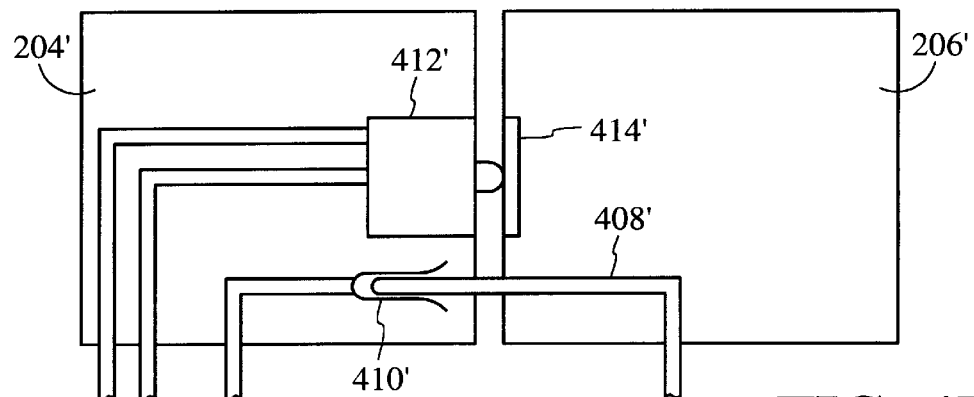

FIG. 4*b* shows a side view of a fully seated connection. FIG. 4*b* also shows connector 204' and 206'. Connector 204' is shown with the signal receptacle 410' having fully received the signal pin 408'. Additionally, the connector sensor 412' has been fully switched by the connector sensor receiver 414'. Accordingly, an indication that a proper connection has been made can be sent.

Figure 5:
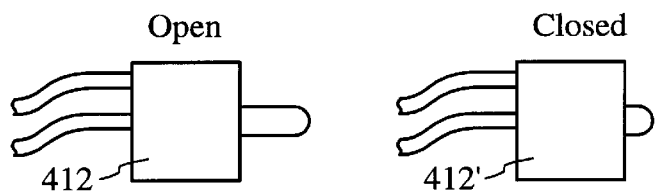
FIG. 5 shows an example of a possible switch which may be utilized with the device according to the present invention.

FIG. 5 shows an example of a connector sensor 412 which can be used in accordance with the present invention. Many different types of switches may be used in the method and device according to the present invention as can be determined by one of ordinary skill in the art. In this particular example, a connector sensor is used which can indicate a connection by leaving a circuit open when the module is not fully connected to the stationary assembly. When the module is fully connected to the stationary assembly, then the connector sensor closes the circuit shown in FIG. 2 to send a signal indicating that the module is fully connected to the stationary assembly.

In addition to being extremely effective at verifying integrity of the connection, the method and device according to the present invention is also very zero inexpensive to implement.

An electrical verification can be provided by using a simple mated-connector wrap scheme where an electrical signal is routed through pins located in a corner of each connector and wrapped on the receiving board and returned to the originator of the signal. Corner pins are preferred to be used since they represent the pins that are most likely to indicate an electrical mating problem. Both ends of the connector are checked, using a preferred total of two pins on each connector. An example of a device according to the present invention includes a connection made by a large pin count connector (240 pins) which can afford to reserve the corner pins for the routing of an electrical signal.

A mechanical verification can be derived from switches such as normally-open switches, which can allow either a partially mated connection (i.e., a connector that is half way engaged but making enough electrical connection to mate the corner pins but not good enough to make other signal connections), or a fully unseated connection (where both the electrical check and mechanical check fail) to be detected and flagged.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A device for insuring integrity of a blind autodock electrical connection for use with a computer system including a stationary assembly and a module, the device comprising:

a first electrical connector coupled to the stationary assembly;

a second electrical connector coupled to the module;

a connector sensor means coupled to the first connector, the connector sensor means comprising a circuit including a status providing device, at least part of the circuit being coupled via the second electrical connector; and a connector sensor receiver coupled to the second connector, the status providing device determining whether the connector sensor means and the connector sensor receiver are coupled in a predetermined manner, wherein the circuit provides an indication of the blind autodock electrical connection integrity.

2. The device of claim 1, wherein the first electrical connector is elongated.

3. The device of claim 1, wherein the second electrical connector is elongated.

4. The device of claim 1, wherein the connector sensor means comprises a switch.

5. A method for ensuring integrity of a blind autodock electrical connection between a stationary assembly and a module within a computer system, the method comprising the steps of:

sensing a connection between the stationary assembly and the module via a status providing device within a connection sensor circuit, the status providing device being coupled to the stationary assembly, and at least part of the connection sensor circuit being coupled to the module; and providing an indication of the blind autodock electrical connection integrity via the connection sensor circuit, wherein the indication includes whether the stationary assembly and the module are coupled in a predetermined manner.

6. The method of claim 5, wherein the connection sensor circuit provides the indication via a connector sensor receiver coupled to the module via a second connector.

7. The method of claim 5, wherein the connection sensor circuit further includes a connector sensor coupled to the stationary assembly via a first connector.

8. The method of claim 7, wherein the connector sensor comprises a switch.

9. The device of claim 1, wherein the connector sensor means includes connector sensors coupled via a wire, at least part of the wire being coupled to the connector sensors via the second electrical connector to create the circuit.

10. The device of claim 9, wherein the status providing device includes a resistor, the resistor being coupled to the wire via the first and second electrical connectors.

11. The device of claim 10, wherein the circuit further includes a status line coupled to the resistor and the connector sensors.

* * * * *